United States Patent [19]
Streefkerk et al.

Patent Number: 6,058,277
Date of Patent: May 2, 2000

[54] PRINTING SYSTEM AND CONTROL METHOD FOR PRINTING IMAGES HAVING A CIRCLE SEGMENT DISPLAY ELEMENT FOR VISUALIZING PRINT JOB PROCESSING TIMES AND MANAGING PRINT JOBS

[75] Inventors: Abraham J. Streefkerk, Amstelveen; Andre M. M. Verhaegh, Eindhoven; Robertus C. W. T. M. van den Tillaart, Gemert, all of Netherlands

[73] Assignee: Océ-Technologies B.V., Ma Venlo, Netherlands

[21] Appl. No.: 09/109,382

[22] Filed: Jul. 2, 1998

[30] Foreign Application Priority Data

Jul. 4, 1997 [NL] Netherlands .............. 1006470

[51] Int. Cl.[7] .................................. G03G 15/00
[52] U.S. Cl. .............................. 399/81; 368/239; 368/240
[58] Field of Search ............................. 399/81; 368/239, 368/240

[56] References Cited

U.S. PATENT DOCUMENTS

| 4,407,587 | 10/1983 | Fujita | 368/240 X |
| 4,511,243 | 4/1985 | Smith | 399/81 |
| 4,816,864 | 3/1989 | Tanaka et al. | 399/81 |
| 5,036,361 | 7/1991 | Filion et al. | 399/81 |
| 5,228,013 | 7/1993 | Bik | 368/239 X |
| 5,491,779 | 2/1996 | Bezjian | 395/140 |

FOREIGN PATENT DOCUMENTS

| 468762 | 1/1992 | European Pat. Off. . | |
| 687972 | 12/1995 | European Pat. Off. . | |
| 56-94366 | 7/1981 | Japan . | |
| 57-90651 | 6/1982 | Japan . | |
| 57-206888 | 12/1982 | Japan | 368/240 |
| 3-143672 | 6/1991 | Japan . | |
| 6-35255 | 2/1994 | Japan . | |

Primary Examiner—Fred L Braun

[57] ABSTRACT

A printing system including at least one printer for printing images on sheets in accordance with electrical image signals fed to the printer, a controller for feeding electrical image signals to the at least one printer and an input unit for receiving and feeding electrical image signals to the controller. The controller includes an operating unit for inputting print orders relating to the electrical image signals to be fed to the at least one printer and a display adapted to display operating information. Order processing time signals are generated that relate to the estimated processing time for printing print orders by the at least one printer. The display also displays a circle segment having an aperture angle whose value is determined by the order processing time signals. As an alternative, an angular position of the circle segment is adjustable and its value is determined by a time signal corresponding to the actual time. Several circle segments may be displayed corresponding to multiple print jobs in the queue or to the estimated processing time of various printers executing a print job. Two circle segments may also be utilized to separately display the number of hours and the number of minutes in the estimated processing time. The circle segments may also be utilized to manipulate the sequence in the print queue by simply selecting and dragging a circle segment to a desired position in the queue.

26 Claims, 5 Drawing Sheets

PRINTING SYSTEM AND CONTROL METHOD FOR PRINTING IMAGES HAVING A CIRCLE SEGMENT DISPLAY ELEMENT FOR VISUALIZING PRINT JOB PROCESSING TIMES AND MANAGING PRINT JOBS

BACKGROUND OF THE INVENTION

1. Technical Field of The Invention

The invention relates to a printing system and control method for printing images on sheets in accordance with electrical image signals fed to the printer. More particularly, the invention relates to an apparatus and method that generates order processing time signals relating to the estimated processing time for the printing of print orders by the printer and generates displays that graphically depict the order processing time signals for one or more printers.

2. Description of Related Art

U.S. Pat. No. 4,511,243 describes an automatic electrophotographic reproduction apparatus with a display which continuously shows, in digital form, both the actual estimated time still required for the print order in progress and the estimated end time at which the print order in progress will be ready. However, there is no display of (1) a waiting time indicating how long it will take until it will be the turn of the next print order to be processed or (2) a time at which the next print order will be printed.

U.S. Pat. No. 4,816,864 describes a programmable copying device provided with a plurality of collecting trays for documents, wherein a document can include one or more sheets. Copying can be preprogrammed and then carried out automatically for the various documents. The processing time for each document is calculated, after which all the calculated processing times are totalled and added to the current time. A display digitally shows the thus predicted time at which all the documents will have been processed. There is no display of any calculated time for processing a specific document or a plurality of documents.

U.S. Pat. No. 5,036,361 describes a reproduction apparatus that continuously displays the time remaining for the processing of a print order in progress. This display may either be in the form of a digital readout of the time remaining or in an analogue form by using a graphic bar, the length of which corresponds to the percentage of the print order that has already been processed. In the '361 patent, there is no graphic display of the expected duration or the end time. Moreover, the display relates only to one order.

European Patent Application EP 0 468 762 describes a system for printing documents wherein the system is provided with a printer and a controller. The controller is adapted to receive print orders from a plurality of input stations. The print orders may have different priorities and may be provided with a specified required end time by which they must be printed. On the basis of the specified priority and any specified required end time, the controller determines the sequence in which the print orders are sent to the printer. A display at the controller indicates digitally the calculated processing time for each print order and the specified or calculated end time of each print order. The user who has sent a print order also receives information concerning the end time of dealing with his print order. In this case, the information is also displayed digitally. Also, the user has no opportunity of moving to a different printer.

SUMMARY OF THE INVENTION

The printing system according to the invention overcomes the above disadvantages.

To achieve this object, the invention utilizes a display adapted to display a segment of a circle with an aperture angle the value of which is determined by order processing time signals.

A graphic representation of this kind for the order processing time signals makes it much easier for a user to rapidly gain an idea of the values thereof. Not only does the size of the displayed area of the circle segment give a rapid visual impression of a period of time, but the shape also intuitively links up with an analogue clock and hence the interpretation is also apparent. This is in contrast, for example, with a bar diagram. The user now has no need to read text or numbers and even at a considerable distance can gain an idea of the values of the order processing time signals.

In one embodiment, the control unit generates a time signal corresponding to the actual time and adjusts an angular position of the circle segment according to the time signal. In this embodiment, in addition to a graphic indication of the duration of the order processing times there is also a graphic indication of times at which these orders will be ready.

Another embodiment utilizes a display adapted to display hour and minute hands, the point of intersection of the longitudinal axes of which coincides with a point of intersection of the extensions of the straight sides of the circle segment. The position of the hands is determined by the time signal. In this embodiment, there is an integration of an analogue clock indication with the display of the order processing times. The user can now literally at a glance see all the required duration and time information of the print orders coupled with the actual time.

Another embodiment divides the circle segment into a first and a second partial circle segment wherein the central aperture angle of the first partial circle segment is determined by the total estimated order processing time of pending print orders previously introduced and still in progress and the aperture angle of the second partial circle segment is determined by the estimated order processing time of the last print order introduced. In this alternative, the user can gain an idea of the size of his own print order in relation to the value of the total waiting time of the print orders already introduced beforehand.

Another alternative divides the circle segment into different partial circle segments each corresponding to a print order, wherein the value of a central aperture angle of a partial circle segment is determined by the order processing time of a print order corresponding to the partial circle segment. In this alternative, the user is provided with a display of not only the total waiting time but also the number and the individual waiting times of separate print orders.

In another embodiment that is particularly advantageous to system operators, the invention arranges the partial circle segments in a sequence of the processing order of the corresponding print orders. The operating unit is then adapted to permit selection of a partial circle segment and shifting of the selected partial circle segment within the arrangement of partial circle segments wherein the processing sequence of the corresponding print orders is adapted to the new arrangement of the partial circle segments.

By combining a graphic display of a queue of orders with a graphic manipulation of the sequence of orders in said queue, it is possible to immediately show the effect of such manipulation.

In embodiments where the operating unit permits selection of a printer from a number of possible printers, a further advantageous development determines the expected order processing times of the selected printer and generates selected order processing time signals corresponding to these order processing times. The display then displays the circle segment on the basis of these selected order processing time signals. In this way a user can, by reference to a waiting time graphically displayed for each selected printer, select a printer which can deal most rapidly with his print order.

A variation of the above embodiment determines the estimated order processing times of different printers and generates order processing time signals corresponding to these order processing times. In this variation, the display simultaneously displays the circle segment for each of the different printers. The user now sees at a glance the situation for various printers as regards waiting time and can select one of these printers on that basis.

A further development utilizes a controller that arranges the different printers in consecutive values of the estimated order processing time signals of the different printers. In this development, each circle segment is displayed in the arrangement of the corresponding printers as determined by the controller. Because the printer having the shortest waiting time now corresponds to a first circle segment of a number of circle segments arranged in series, the user is already given a suggestion as to which printer he can best select.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF PREFERRED EMBODIMENTS

Figure 1:
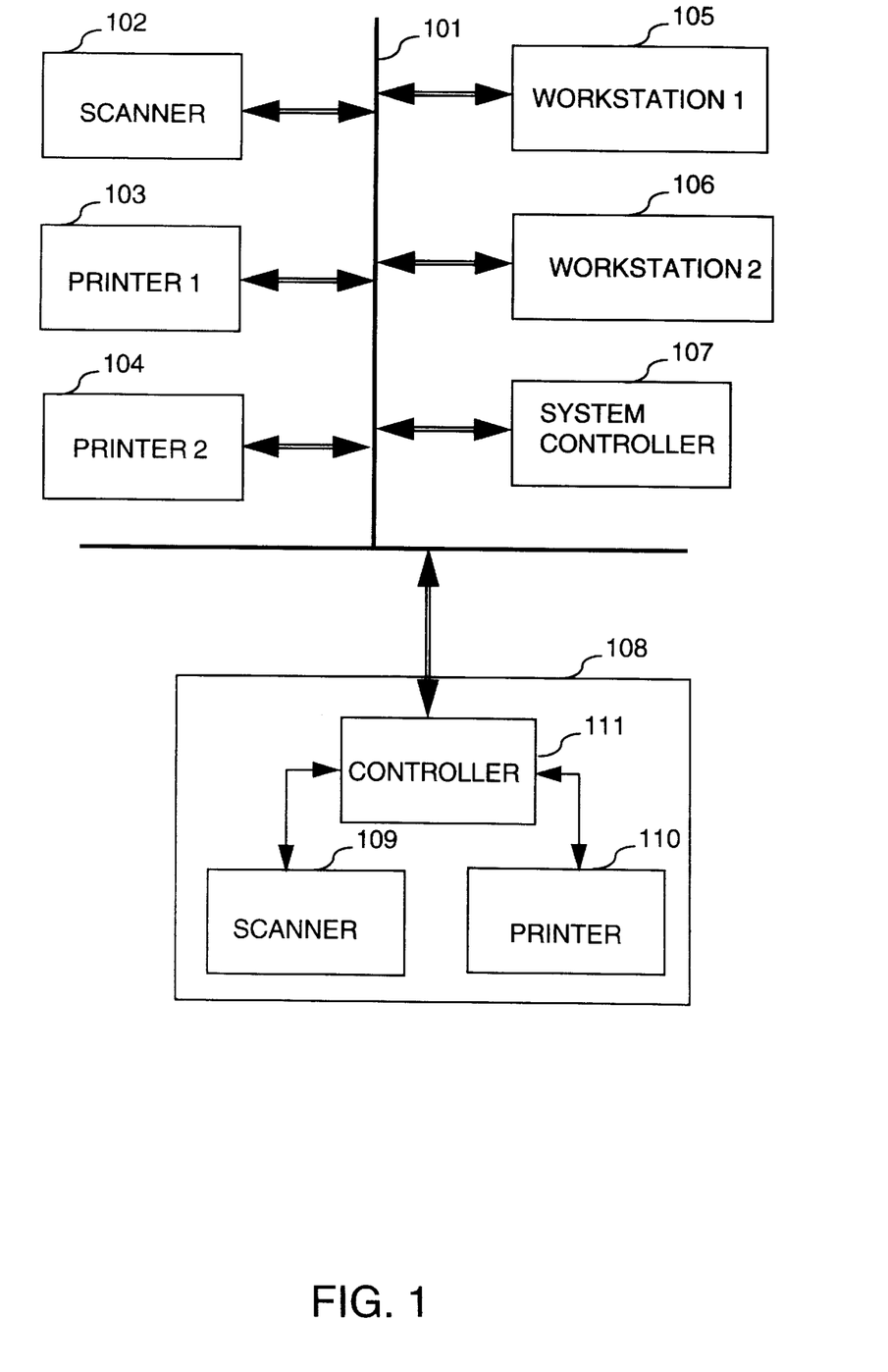
FIG. 1 is a diagram showing one possible configuration of a printing system according to the invention.

FIG. 1 diagrammatically illustrates a printing system consisting of a number of separate units interconnected via a network bus 101. The bus 101 is suitable for conveying both electrical image signals and control signals between the units connected to the network bus 101. The units connected to the network bus 101 include a scanner 102, a first printer 103, a second printer 104, a first workstation 105, a second workstation 106, a system controller 107 and a combined scanner and printer combination 108.

The scanner 102 produces electrical image signals by scanning original sheets photoelectrically, for example with CCDs. The printers 103 and 104 print images on sheets from corresponding electrical image signals fed thereto. The printers 103 and 104 may, for example, be of the electrophotographic type with laser or LED exposure or of the inkjet type.

The workstations 105 and 106 generate electrical image signals which can be produced by techniques other than by scanning. These techniques include image information stored in a digital storage medium, generated by a word processor, or created by a CAD/CAM design station and the like. The users of a workstation usually do not have complete control over the printing system, but can file requests for printing electrical image signals supplied by them.

The system controller 107, on the other hand, offers a system operator the opportunity of controlling the entire printing system. The scanner and printer combination 108 also includes a scanner 109, a printer 110 and a controller 111. This combination 108 can both scan and print independently of the printing system, under the control of the controller 111, and can also be controlled remotely by the workstations 105 and 106 or by the system controller 107 as well as be provided with electrical image signals.

Figure 2:
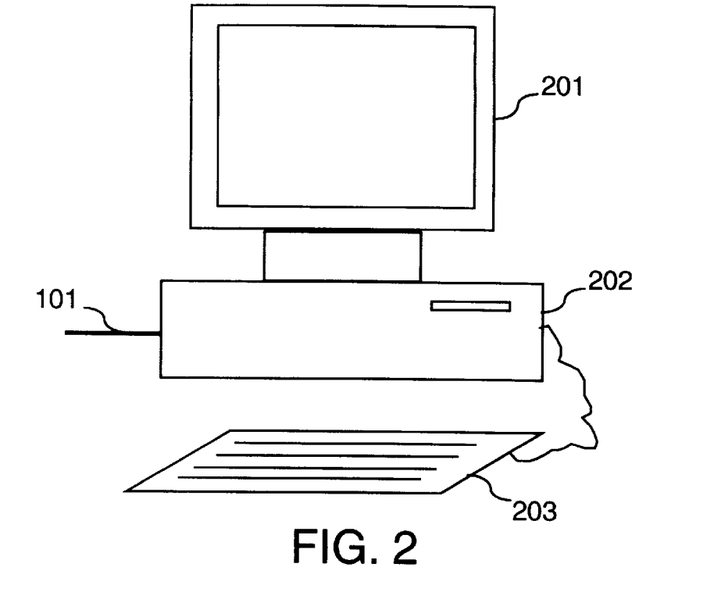
FIG. 2 shows a remote control unit for a printing system according to the invention.

FIG. 2 illustrates one possible embodiment of the workstations 105 and 106 and the system controller 107. The controller 202 is connected to the network bus 101 and is provided with a display unit in the form of a VDU (video display unit) 201 and an operating unit in the form of a keyboard 203.

Figure 3:
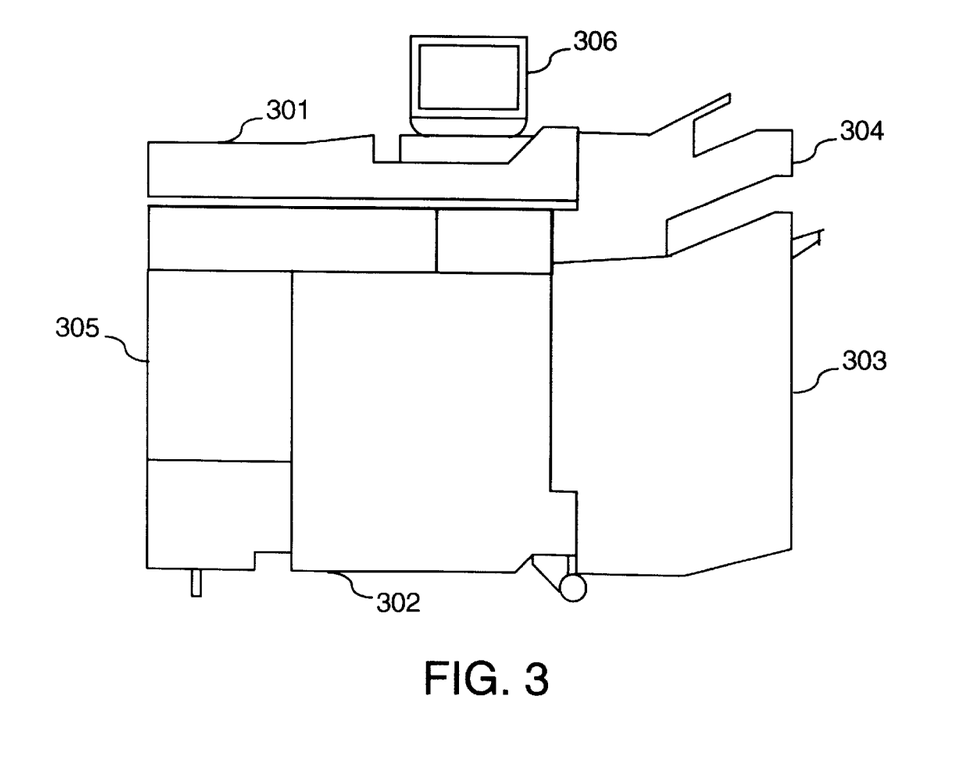
FIG. 3 shows a local control unit for a printing system according to the invention.

FIG. 3 illustrates one possible embodiment of the scanner and printer combination 108. The combination includes a scanner 301, a printer 302, a sheet reservoir 303, a sheet delivery module 304, control modules 305 and a display unit 306. The display unit includes a display with keys (not shown in detail) for inputting operating orders.

Figure 4:
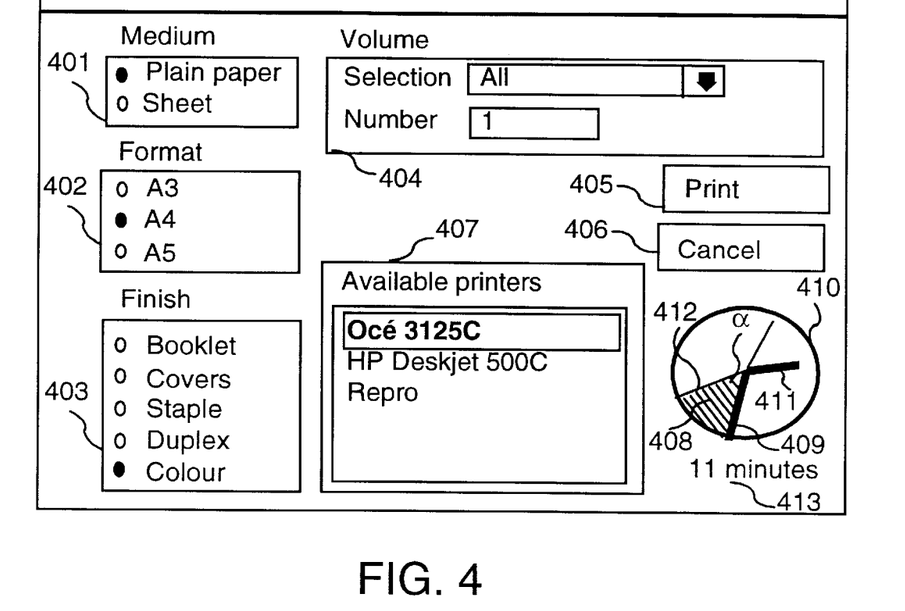
FIG. 4 shows in greater detail a first embodiment of a display in a control unit for a printing system in accordance with the invention.

FIG. 4 shows in greater detail the display generated by a first embodiment of the invention. The display is shown on the display units 201 and/or 306 which provide an interface for the inventive control system. If the display is in the form of a CRT or LCD screen, the information displayed thereon can be selected freely.

In practice, the display shown in FIG. 4 is a specific screen from a number of possible display screens. The display shown is utilized for selecting a printer for printing a print order. The user or operator can enter what options he wishes to select from a selected printer. For this purpose the display shows an entry area 401 for the supply of plain paper or special sheets, an entry area 402 for selecting the paper format, an entry area 403 for finishing, an entry area 404 for the quantity of sheets for printing, a print start area 405 and a cancel area 406.

The options displayed in these areas can be selected in various ways. For example, it is possible to use a mouse-controlled cursor, keys disposed next to the screen or, in the case of a touch screen, by touching the areas themselves. The printer option area 407 gives a list of selectable printers of the printing system.

According to the invention, a graphic display is also shown, in the form of a coloured or shaded segment 408 of a circle. The shaded circle segment 408 represents the estimated waiting time before the printer selected in the printer option area 407 is available to execute the print order. The waiting time is caused by previous print orders which may have been given by other users. An estimate of the expected total processing time can be calculated by a suitable algorithm, e.g. based on the number of sheets for printing and the printer printing speed.

The size of the central aperture angle α of the circle segment 408 is defined by the estimated waiting time in minutes divided by 60. In this case the maximum waiting time to be displayed is therefore 60 minutes. A first straight side 409 of the circle segment 408 coincides with a minute hand of an analogue clock, which is also displayed with a dial 410 and a short hour hand 411. In these conditions the analogue clock indicates the actual time. The side 409 of the circle segment moves with the minute hand. The other straight side 412 of the circle segment 408, on the other hand, is displayed in a fixed position at the expected starting time when the print order can be started. Finally, the time corresponding to the circle segment 408 (e.g. 11 minutes) is also continuously displayed digitally in a display field 413 intended for the purpose.

If a different printer is selected from the printer selection list 407, the value of the central aperture angle α of the circle segment 408 is automatically adapted or updated to the waiting time for the printer then selected. The estimated waiting time can in fact vary with each printer, not only due to the supply to a specific printer but also the productivity of a printer.

In the event that the expected waiting time is longer than 60 minutes, this fact can be displayed by the display field 413, either as the total number of minutes or as the number of complete hours.

Figure 5:
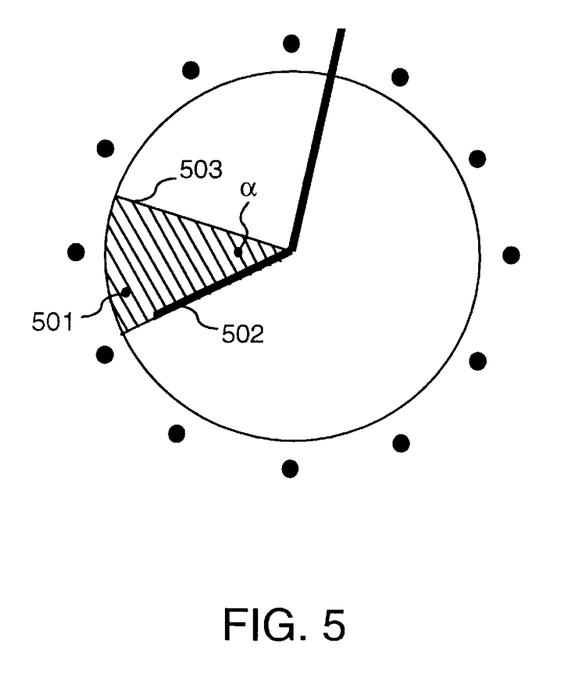
FIGS. 5–9 show further details and alternatives of the display in accordance with alternative constructions of the control unit according to the invention.

Alternatively, according to an embodiment shown in FIG. 5, the expected waiting time can be indicated by a circle segment 501, the first side 502 of which coincides with an hour hand of an analogue clock. The other straight side 503 is, in this case, positioned on the expected time in hours when the print order is due to start. This alternative permits the displayed maximum waiting time to be extended to twelve hours. The central aperture angle a of the circle segment 501 is proportional to the waiting time in hours divided by 12 in this alternative.

A combined embodiment is obtained by selecting the display shown in FIG. 4 in the case of a waiting time that is less than 1 hour, and selecting the display shown in FIG. 5 in the case of a waiting time that exceeds 1 hour.

Figure 6:
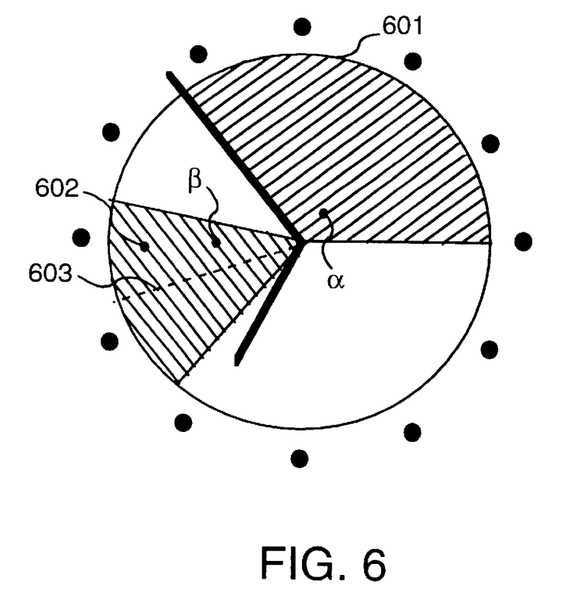

FIG. 6 shows a third embodiment in which a first circle segment 601 displays the number of minutes remaining after deduction from the number of complete hours wherein the term "complete hours" refers to the number of full hours in the expected waiting time. A second circle segment 602 shows the number of complete hours modulo 12. As long as the expected waiting time is, for example, more than 2 hours, the circle segment 602 has a fixed aperture angle β of 2/12*360°. If the waiting time is less than 2 hours but more than 1 hour, the circle segment 602 has a fixed aperture angle β of 1/12*360°. The aperture angle α of the circle segment 601 is continuously defined and updated by the number of minutes remaining after deduction from the number of complete hours of the waiting time.

As further shown in FIG. 6, the second circle segment 602 that indicates the number of complete hours may be divided by a dashed line 603. The dashed line 603 breaks the aperture angle β of the second circle segment 602 into equal-hour slices. This segmentation of the aperture angle β by line 603 provides a fiducial mark visually indicating the number of complete hours remaining in the expected waiting time. Similar fiducial marks may also be utilized to break the aperture angle α into equal-time slices (e.g. 10 minute slices).

Figure 7:
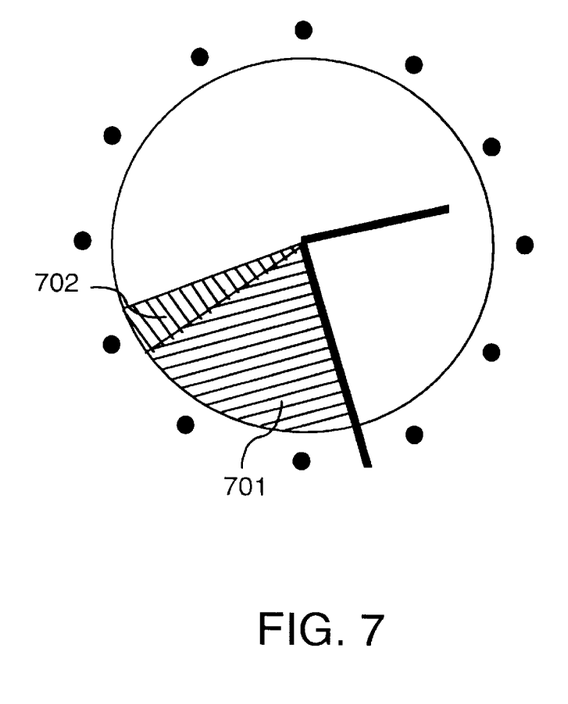

FIG. 7 shows a fourth embodiment with a first circle segment 701 and a second circle segment 702 which differ in colour or shading. The first circle segment 701 continuously indicates the waiting time in minutes before it is the turn of a print order newly introduced by the user. The second circle segment 702 indicates the processing time in minutes of an order newly introduced by the user. In other words, the first circle segment indicates the time remaining until the newly introduced print order will begin printing and the second circle segment 702 indicates the time to process or print the newly introduced print order. In this way, a user can obtain a visual summary of the total time and thereby gain an idea of the expected processing time for his own print order.

It should also be noted that one side of a circle segment (e.g. side 409 in FIG. 4) need not necessarily be coupled to an hour or minute hand. In the case, for example, of pre-programmed print jobs in which a future period of time is reserved for a print job, this period is displayed by a circle segment detached from the minute or hour hand.

Depending on the length of the expected processing times, it may be advantageous to adopt a 12-hour scale instead of a 24-hour scale, and vice versa.

Figure 8:
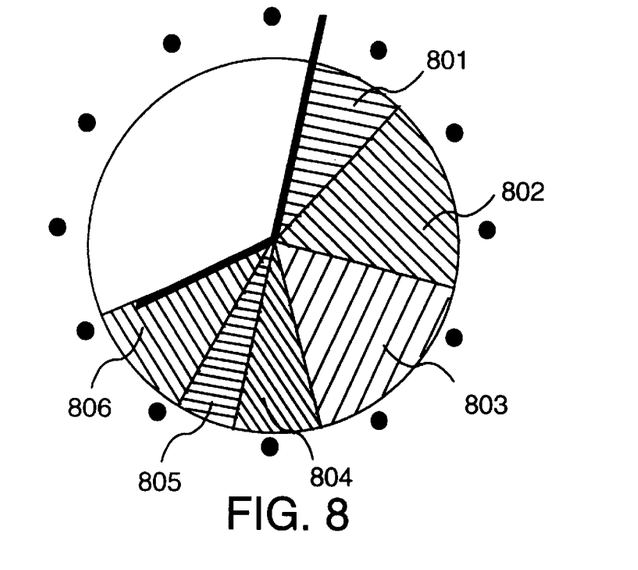

FIG. 8 shows a fifth embodiment in which each print order is allocated its own circle segment 801–806, the central aperture angle of which corresponds to the expected processing time of the corresponding print order. A user or system operator can then have an idea of the queue build-up of print orders.

Another advantageous embodiment is obtained if an identification code identifying a print order is displayed at each circle segment 801–806. Such identification codes help the user or system operator to select a specific circle segment 801–806 and move it in the series of segments 801–806 so that the processing sequence of the print orders is adjusted accordingly. In other words, the processing sequence can be altered by simply selecting a circle segment and dragging the selected circle segment to the desired processing sequence position.

A further advantageous embodiment is obtained by displaying the processing sequences of print orders for more than one printer simultaneously. For instance, the display as shown in FIG. 4 will depict, next to each other, three dials 410 each corresponding to one of the three available printers. With displaying in each dial 410 the processing sequence of print orders such as illustrated in FIG. 8, it is further advantageous to be able to move a print order from one printer to another printer by simply selecting and dragging the corresponding circle segment from one dial to the other dial. The corresponding processing times are subsequently adapted to the new processing sequences.

Figure 9:
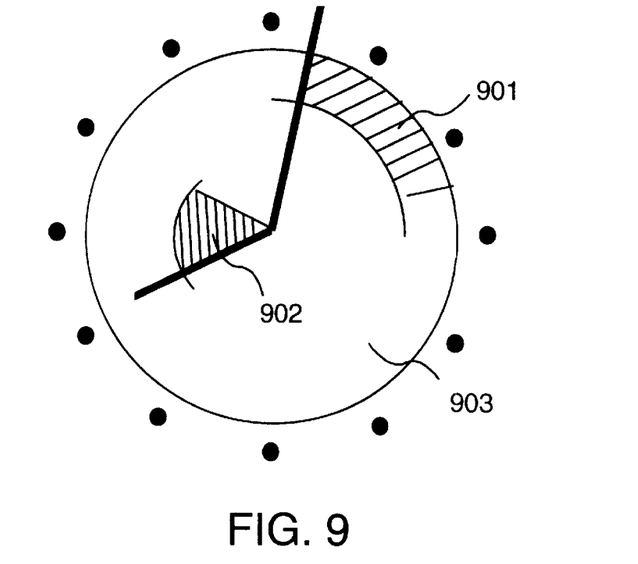

FIG. 9 shows a sixth embodiment with alternative circle segments 901 and 902 which do not cover the entire circle area 903. The circle segment 901 continuously displays the number of minutes after deduction from the number of complete hours of the waiting time. In this embodiment circle segment 901 is confined to a strip or annulus along the edge of the circle area 903. It should be noted that in an extreme case the circle segment 901 may be formed by just a part of the edge itself via highlighting or changing the color of an edge segment. The circle segment 902 indicating the whole number of hours of the waiting time is confined to an innermost part of the circle area 903. To keep the areas 901, 902 from interfering, an outermost edge of the area 902 is preferably at a radial position less than a radial position of an innermost edge annulus 901.

Other embodiments (not shown in detail) can be obtained by combinations of one or more of the embodiments described. Also, a simple embodiment can be obtained by not superimposing an explicit hour and minute hand.

For example, a seventh embodiment (not shown in detail in a drawing) is obtained wherein the above-mentioned circle segments of different printers are displayed simultaneously and next to one another in accordance with the order processing times expected per printer. This applies to all the above embodiments for the display of circle segments.

An eighth embodiment, which is also not shown in the drawing, is obtained wherein the corresponding circle segments of different printers are displayed in sequence in accordance with the estimated order processing times for each printer. This display is effected in accordance with an arrangement based on the consecutive length of these order processing times.

Finally it should be noted that the controller, instead of being specially designed, can also be constructed from general computers such as personal computers or generally available workstations which can function in the manner according to the invention simply by means of a specific control program.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

We claim:

1. A printing system, comprising:
   a printer for printing images on sheets in accordance with electrical image signals fed to the printer,
   control means for feeding the electrical image signals to said printer,
   input means for receiving and feeding electrical image signals to said control means,
   said control means including operating means for inputting print orders relating to electrical image signals to be fed to said printer,
   display means for displaying operation information, and
   means for generating order processing time signals relating to the estimated processing time for the printing of print orders by said printer,
   said display means displaying a circle segment with an aperture angle, wherein the value of the aperture angle is determined by the order processing time signals.
   said control means generating a time signal corresponding to an actual time,
   wherein an angular position of the circle segment is adjustable and the value of the angular position is adjusted by the time signal.

2. The printing system according to claim 1,
   said display means displaying hour and minute hands such that the point of intersection of longitudinal axes of the hands coincides with the point of intersection of extensions of straight sides of the circle segment and wherein the position of the hands is determined by the time signal.

3. The printing system according to claim 1,
   wherein the circle segment is divided up into a first and a second partial circle segment having first and second aperture angles, respectively,
   wherein the first aperture angle of the first partial circle segment is determined by the total estimated order processing time of print orders previously introduced and still in progress, and
   wherein the second aperture angle of the second partial circle segment is determined by the estimated order processing time of a last-introduced print order.

4. The printing system according to claim 1,
   wherein the circle segment is divided into partial circle segments each corresponding to a print order,
   wherein the value of an aperture angle of each partial circle segment is determined by the order processing time of the print order corresponding to each partial circle segment.

5. The printing system according to claim 4,
   wherein the partial circle segments are arranged in a sequence corresponding to a processing sequence of the corresponding print orders,
   said operating means permitting an operator to select of one of the partial circle segments and shift a position of the selected partial circle segment in the arrangement of partial circle segments,
   wherein the processing sequence of the corresponding print orders is adapted to the new arrangement of the partial circle segments.

6. The printing system according to claim 5, further comprising:
   a plurality of said printers,
   said display means displaying, for more than one printer, the partial circle segments corresponding to the processing sequence of each printer, simultaneously and next to each other,
   said operating means permiting an operator to select of one of the partial circle segments of one of said printers and move a position of the selected partial circle segment to the arrangement of the partial segments of another of said printers, thereby creating a new arrangement of the partial circle segments,
   wherein the processing sequence of the corresponding print orders is adapted to the new arrangement of the partial circle segments.

7. The printing system according to claim 1, further comprising:
   a plurality of said printers,
   means for determining the estimated order processing times of said printers and generating order processing time signals corresponding to these order processing times,
   said display means simultaneously displaying the circle segment for each of said printers.

8. The printing system according to claim 7,
   said control means arranging said printers in an order corresponding to consecutive lengths of the estimated order processing time signals of said printers,
   said display means displaying each circle segment according to the arrangement of the corresponding printers as determined by said control means.

9. The printing system according to claim 1,
   wherein the circle segment is divided up into a first and a second partial circle segment having first and second aperture angles, respectively,
   wherein the first aperture angle of the first partial circle segment is determined by the number of whole hours in the estimated order processing time, and
   wherein the second aperture angle of the second partial circle segment is determined by subtracting the number of whole hours from the estimated order processing time, said display means displaying the first partial circle segment at a location distinct from the second partial circle segment.

10. The printing system according to claim 9,
said control means generating a time signal corresponding to an actual time,
said display means displaying hour and minute hands such that the point of intersection of longitudinal axes of the hands coincides with the point of intersection of extensions of straight sides of the first and second partial circle segments and wherein the position of the hands is determined by the time signal,
wherein an angular extent of the first and second partial circle segments is adjustable and the value of the angular extent is adjusted by the time signal.

11. The printing system according to claim 10,
said display means aligning a first straight side of the first partial circle segment with the hour hand, and
said display means aligning a first straight side of the second partial circle segment with the minute hand.

12. The printing system according to claim 10,
wherein the second partial circle segment is a partial annular ring, and
wherein an outermost edge of the first partial circle segment is displayed at a radial position less than a radial position of an innermost edge of the partial annular ring.

13. The printing system according to claim 1, further comprising:
a plurality of said printers,
said operating means permitting selection of a printer from said plurality of printers,
the printing system still further comprising
means for determining the estimated order processing time of the selected printer and generating a selected order processing time signal corresponding to the order processing time,
said display means displaying the circle segment on the basis of the selected order processing time signal.

14. A method of controlling a printer system, comprising the steps of:
displaying operating information that permits an operator to input a print order,
generating order processing time signals relating to the estimated processing time for printing the print orders with a printer,
determining a value of an aperture angle of a circle segment according to the order processing time signals,
displaying the circle segment having the determined aperture angle value,
generating a time signal corresponding to an actual time, and
adjusting the angular position of the circle segment according to the time signal.

15. The method according to claim 14, further comprising the steps of:
displaying hour and minute hands such that the point of intersection of longitudinal axes of the hands coincides with the point of intersection of extensions of straight sides of the circle segment, and
determining the position of the hands according to the time signal.

16. The method according to claim 14, further comprising the steps of:
dividing the circle segment into partial circle segments each corresponding to a print order, and
determining the value of an aperture angle of each partial circle segment according to the order processing time of the print order corresponding to each partial circle segment.

17. The method according to claim 16, further comprising the steps of:
arranging the partial circle segments in a sequence corresponding to a processing sequence of the corresponding print orders,
permitting an operator to select of one of the partial circle segments and shift a position of the selected partial circle segment thereby generating a new arrangement of partial circle segments, and
adapting the processing sequence of the corresponding print orders to the new arrangement of the partial circle segments.

18. The method according to claim 17, further comprising the steps of:
arranging, for more than one printer, the partial circle segments corresponding to processing sequence of each printer, simultaneously and next to each other,
permitting an operator to select one of the partial circle segments of one of the printers and move a position of the selected partial circle segment to the arrangement of the partial segments of another of said printers thereby creating a new arrangement of the partial circle segments, and
adapting the processing of the corresponding print orders to the new arrangement of the partial circle segments.

19. The method according claim 14, further comprising the steps of:
determining the estimated order processing times for each of the printers,
generating order processing time signals corresponding to the order processing times for each of the printers, and
simultaneously displaying the circle segment for each of the printers.

20. The method according to claim 19, further comprising the steps of:
arranging the printers in an order corresponding to consecutive lengths of the estimated order processing time signals of the printers,
displaying each circle segment according to the arrangement of the corresponding printers as determined by said arranging step.

21. The method according to claim 14, further comprising the steps of:
dividing the circle segment into a first and a second partial circle segment having first and second aperture angles, respectively,
determining the first aperture angle of the first partial circle segment according to the number of whole hours in the estimated order processing time,
determining the second aperture angle of the second partial circle segment by subtracting the number of whole hours from the estimated order processing time, and
displaying the first partial circle segment at a location distinct from the second partial circle segment.

22. The method according to claim 21,
generating a time signal corresponding to an actual time,
displaying hour and minute hands such that the point of intersection of longitudinal axes of the hands coincides with the point of intersection of extensions of straight sides of the first and second partial circle segments, determining the position of the hands according to the time signal, and adjusting an angular extent of the first and second partial circle segments according to the time signal.

23. The method according to claim 22, further comprising the steps of:

aligning a first straight side of the first partial circle segment with the hour hand, and aligning a first straight side of the second partial circle segment with the minute hand.

24. The method according to claim 22, wherein the second partial circle segment is a partial annular ring, and wherein an outermost edge of the first partial circle segment is displayed at a radial position less than a radial position of an innermost edge of the partial annular ring.

25. The method according to claim 14, further comprising the steps of:

dividing the circle segment into a first and a second partial circle segment having first and second aperture angles, respectively, determining the first aperture angle of the first partial circle segment according to the total estimated order processing time of print orders previously introduced and still in progress, and determining the second aperture angle of the second partial circle segment according to the estimated order processing time of a last-introduced print order.

26. The method according to claim 14, further comprising the steps of:

permitting an operator to select a printer from a plurality of printers, determining the estimated order processing time of the selected printer, generating a selected order processing time signal corresponding to the order processing time, and displaying the circle segment on the basis of the selected order processing time signal.

* * * * *